Dec. 5, 1950        R. A. HAEGELE        2,533,007

EGG OPENER HAVING PIVOTED HAMMER

Filed Nov. 15, 1945

INVENTOR
Richard A Haegele
BY
ATTORNEYS

Patented Dec. 5, 1950

2,533,007

UNITED STATES PATENT OFFICE 2,533,007

EGG OPENER HAVING PIVOTED HAMMER

Richard A. Haegele, Elmhurst, Ill.

Application November 15, 1945, Serial No. 628,943

6 Claims. (Cl. 146—2)

This invention relates to egg openers and has particularly to do with an improved impact device for cleanly severing the shells of either boiled or raw eggs. The devices described herein are improved forms of the egg opener disclosed in applicant's United States Patent No. 2,260,836. The device disclosed in the prior patent and that disclosed herein relate to the general type of egg openers utilizing a sharp circular edge for cleanly breaking the shell of an egg held in contact with the device by subjecting the cutting edge to an axial blow or impact.

The general object of the invention is to provide improved means whereby the force of impact is more effectively utilized in breaking the shell of the egg.

A more specific object is to provide an egg opener having improved means to insure the equal distribution of a blow along the cutting edge.

Another object is to provide a cutting head structure having a minimum mass but having great inherent rigidity in the direction of application of the cutting force.

A further object of the invention is to provide a cutting cup structure adapted to conform exactly to the shape of the egg in spite of circular irregularity.

It is still another object of my invention to provide means for creating an impact so designed and arranged to enable repeated use with a minimum of wear.

It is a still further object of my invention to provide improved means for containing the egg when the device is used as an egg cup and to reduce any tendency for the egg to become dislodged from the cup while it is being consumed.

It is yet another object of my invention to provide a combined egg opener and egg cup which may be easily and inexpensively constructed of stamped parts without the necessity for machining operations.

Still another object of my invention is to provide an egg cup which may be readily and completely cleaned after use.

Further objects and advantages will be apparent as the following description proceeds taken in connection with the accompanying drawings, in which.

Figure 4:
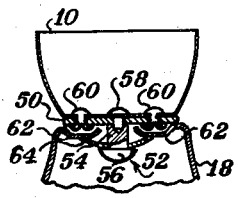
Fig. 4 is a sectional view of a modified form of my invention.

For purposes of exemplification and explanation, the invention has been shown herein as embodied in an egg opener which may be used either as a household appliance or in restaurants and the like. Despite the fact that several embodiments of the invention have been shown and described herein in some detail, there is no intention thereby to limit the invention to such embodiments, but on the other hand the appended claims are intended to cover all modifications and alternative constructions falling within the spirit and scope of the invention.

Because of the peculiar brittle nature of an egg shell, it is of primary importance in producing a clean fracture to apply a force to the cutting edge in the form of a sharp blow or impact. This has been found to produce localized stresses which enables the cutting to take place without producing cracks or loose chips of egg shell. In improving the operation of the impact type of egg opener, I have found that more satisfactory results are produced if the cutting head is so designed as to acquire a maximum instantaneous initial velocity. In order to accomplish this, it is necessary that the cutting head be movably mounted or floating with respect to the standard or base and further that the cutting head be of a minimum mass without sacrificing axial rigidity. Further, it has been found desirable to so construct the cutting head that the cutting edge may be deformed to exactly follow the surface of the egg. The structures utilized in accomplishing these desirable results, together with other ancillary advantages, are set forth in the drawings.

Figure 3:
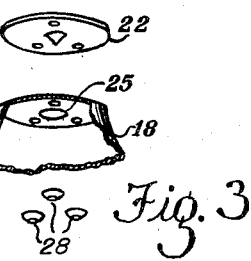
Fig. 3 is an exploded view showing the method of assembling the device shown in Fig. 2.
Figure 2:
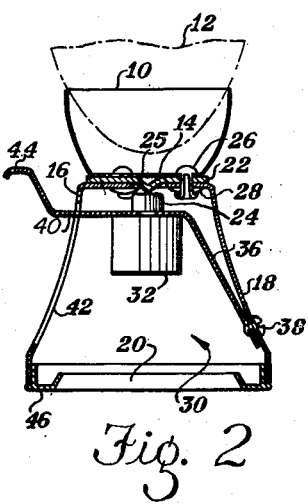
Fig. 2 is a sectional view of the device shown in Fig. 1.

In the embodiment illustrated in Figs. 2 and 3, the cutting head 10 is constructed in the form of a cup, preferably a truncated ellipsoidal cup. The diameter of the cutting head or cup is such that the end portion only of an egg is removed, the egg being illustrated at 12 in Fig. 2 by means of the dot-dash lines. The base portion 14 of the cup is arranged in abutting relation to the upper end 16 of a standard or support 18. The standard at its lower end is provided with a flange having an aperture 20 to receive an egg when the device is alternately used as an egg cup.

In my preferred embodiment, the cutting head 10 is formed of light gauge metallic stock, preferably by a stamping operation. The use of light gauge metal results in a sharp cutting edge without the necessity of machining a bevel. An additional advantage obtained by the use of light gauge metal is that the cutting head is readily deformable to adapt itself to irregularities of curvature in the surface of the egg shell. It has been found that the use of light gauge metal does not instantaneously sacrifice axial rigidity nor attenuate the force applied to the egg shell.

In order to transmit the force of impact to the side walls of the cutting cup 10, an impact plate or thrust disk 22 is provided. The disk is preferably constructed of metal stock which is sufficiently heavy to resist deformation upon impact and to transmit the blow to the cutting cup with undiminished force. In order to enable the disk to be more readily acted upon by the hammer through the aperture 25 in the standard, an upraised boss 24 may be provided. This boss has the additional advantage of converting the force of impact into motion in the axial direction. If desired, the boss may be provided by dimpling or striking up the stock into the form of a cone. Such dimpling results in increasing rigidity of the impact plate.

The cutting head 10 and the standard 18 are kept in engagement by the rivets 26 which also engage spring washers 28. The spring washers, which may be of the dished or concave type, serve to keep the cutting head and the standard in resilient abutting relation while allowing for axial movement of the head. While spring washers are used in the preferred embodiments, it will be noted that they are not essential to the operation of the egg opener and may be dispensed with if desired. The primary requirement is that provision be made for axial movement of the cutting head with respect to the standard. The use of spring washers has the advantage of producing neater, more workmanlike, appearance and operation. Such washers further serve to absorb the energy of impact as the deflection exceeds a predetermined magnitude.

The hammer indicated generally by the numeral 30 consists of a weight 32 and a head or striking portion 34. The hammer is mounted on a flat spring strip 36 which is fastened near the lower edge of the standard by means of rivets or machine screws 38. An extension 40 of the spring strip projects through a slot-like aperture 42 in the body of the standard leading to a handle or trigger member 44. Several advantages in the use of a spring strip for actuating the hammer will be apparent. The use of a spring strip member allows a maximum amount of space to be available within the standard since, as shown in Fig. 2, the strip can be caused to conform closely to the shape of the side wall of the standard. An additional advantage in the use of a spring strip lies in the fact that the hammer may be readily attached by insertion of the hammer head through an aperture provided in the strip and subsequently upsetting the hammer head to increase its lateral dimensions and lock it to the strip. Further use of a spring strip enables the formation of a handle or trigger 44 integrally with the strip. If desired, a lateral notch may be provided at the lower end of the slot 42 to enable the spring strip to be put under tension or "cocked" prior to the breaking or opening of an egg; however, such provision is not necessary for the successful use of the device.

At the lower edge of the standard, an annular insert or flange 46 is provided which may be removed if desired to facilitate cleaning.

In operation, the handle 44 is depressed causing movement of the hammer head and the storage of energy in the spring 36. When the handle is released, the hammer flies upwardly with great velocity imparting a sudden blow to the boss 24 at the center of the impact plate 22. Assuming the impact plate to be substantially rigid, the axial force will be transmitted to the side walls of the cutting head. Because of the extremely light mass of the combined impact plate and cutting head, the cutting head will acquire an extremely high initial velocity to produce a clean fracture of the egg shell along the line of contact with the cutting head. The spring washers 28 are preferably not under initial tension enabling substantially all of the energy of impact to be used in the cutting process. However, since the spring washers 28 will normally follow Hooke's law, as the deflection is increased such spring washers will be effective to absorb the excess energy.

While concave spring washers have been shown in the embodiment just described, it will be obvious to one skilled in the art that a helical spring, or any other type of spring member having an equivalent function, could be used.

In Fig. 4, an embodiment is shown which functions in much the same manner, but is structurally somewhat different from that just described. In this embodiment, the cutting head 10 abuts an impact plate 50. The impact plate has an upstanding projecting member 52 which may, for example consist of a rivet provided with a hollow shank 54 and a spring engaging head 56. A dowel pin 58, passing through the impact plate 50, engages the hollow shank 54. Such engagement may either be frictional in nature or the dowel may be threaded into the shank of the projecting member. In my preferred embodiment, the impact plate is fastened to the base of the cutting head 10 by means of rivets 60. In order to enhance the appearance and to provide for more accurate centering of the cutting head within the standard, depressions 62 may be provided in the upper end of the standard to receive the rivet ends.

In order to keep the cutting head and the upper end of the standard in engagement, I provide a concave spring washer 64. This washer performs the same function as performed by washers 28 in the embodiment previously described. The embodiment of Fig. 4 has an advantage over that shown in Fig. 2 in that fewer parts are required to be assembled. A further advantage lies in the fact that the length of the rivet shank is fixed and may not be inadvertently decreased by over-peening the end of the rivet. While a press fit has been used between the rivet shank 54 and the dowell 58 to maintain the rivet in engagement with the impact plate, it will be obvious that other methods of fastening, for example welding, could be used if desired. It will also be obvious that the head 56 may be threaded or otherwise removably fastened to the rivet shank 54 instead of making it integral with the shank as shown. In the embodiment shown in Fig. 5, a spring disk or diaphragm is used to interconnect the cutting head 10 and the standard 18. The disk 66, which may be constructed of spring steel, phosphor bronze or the like, is provided with means near the periphery for engaging the upper end 16 of the standard 18. The fastening means may, for example, consist of rivets 68 engaging registering holes in the spring disk and standard. Near the center of the disk, means are provided for attaching a disk to the impact plate 22 and the cutting head 10. I prefer to make the attachment at this point by means of one or more rivets 70.

Figure 5:
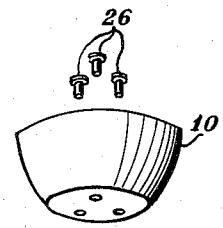
Fig. 5 is an exploded view showing an alternate construction utilizing a spring disk.
Figure 5:
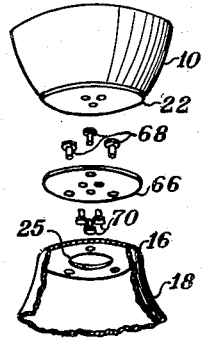

The spring disk 66 may be radially slotted if desired to increase its flexibility. Further, if desired, the disk may be mounted inside the standard rather than outside as shown in Fig. 5, although it will be understood that mounting the disk as shown provides a greater opportunity for flexure.

Figure 6:
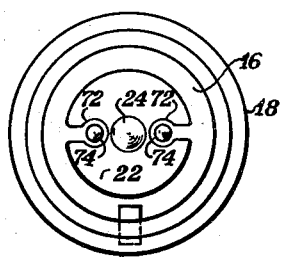
Fig. 6 is a bottom view of another embodiment of my invention.

Because of the small magnitude of deflection required to cause breakage of the shell, it has been found feasible to construct the resilient coupling between the cutting head and the standard integrally from the material of which the standard is constructed. Fig. 6 shows a bottom view of an egg opening device in which such construction is used. At the upper end 16 of the standard, inwardly projecting ears or tabs 72 are provided. Such tabs may be rigidly fastened to the impact plate 22 and the cutting head 10 by means of rivets 74.

In spite of the fact that the metal of which the standard is constructed is generally considered to have little flexibility, satisfactory operation is readily attained with this structure. In order to limit the bending and deflection of the tabs 72, it is desirable that the tabs be firmly anchored to the impact plate. Thus, axial deflection, which has a tendency to elongate the tabs, will be limited by the fact that such elongation can take place only to a very limited degree.

Figure 1:
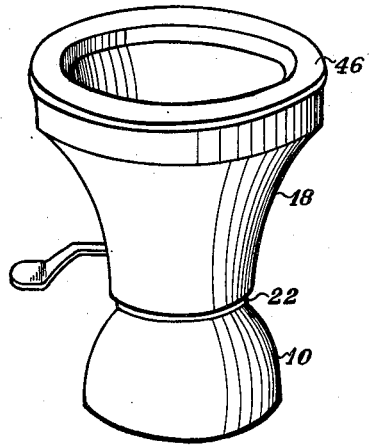
Figure 1 is a general view showing the appearance of the device when used as an egg cup.

By inverting the device into the position shown in Fig. 1, a very convenient and satisfactory egg cup is produced. The size of the aperture 20 of the annular insert 46 may be chosen to correspond with the size of eggs consumed in the locality, although a given insert will normally accommodate a wide variety of sizes. It will be noted that the flat surface presented by the weight 32 may serve as an additional support for the egg.

I claim as my invention:

1. An appliance of the character set forth comprising an egg-engaging cup of light-gauge metal having a base and an upstanding edge, a reinforcing impact plate in engagement with said base, a standard for carrying said cup, a resilient mount allowing limited relative axial movement of said cup with respect to said standard, a hammer for applying an axial blow to said cup, said reinforcing impact plate so constructed and arranged as to protect the base of said cup and to distribute the force of impact to said upstanding edges of said cup with a minimum of attenuation.

2. An egg opener comprising an egg-engaging cup of light-gauge metal having a base portion and an upstanding wall portion, a reinforcing impact plate engaging the base of said cup, a standard for carrying said cup, a resilient mounting means associated with said cup and said standard and arranged to allow limited axial movement of said cup, a hammer mounted on said standard and arranged to impart an axial blow to said cup, said impact plate including a central portion struck up in the direction of said hammer to increase the rigidity of said plate and to present a point of axial impact to said hammer.

3. An egg opening device comprising a cup having sharp egg-engaging edges, a standard for mounting said cup, said standard having an aperture axially centered with respect to said cup, a spring disk connected at its outer edges to the portion of said standard surrounding said aperture, said cup being mounted on the central portion of said disk to provide resilient engagement between said cup and standard, and hammer means for applying axial impact to said cup, said disk allowing limited resilient axial movement between said cup and said standard.

4. In an appliance of the character described, a cup having a sharp egg-engaging edge, a standard carrying said cup and having an aperture located coaxially with the base of said cup, rivets engaging said cup and said standard, said rivets of such length as to allow limited axial movement between said cup and said standard, spring washer means engaging said rivets whereby said cup is kept in normal resilient engagement with said standard, and hammer means located within said standard and arranged to impart an axial blow to said cup through said aperture.

5. In a device for cutting an egg shell, a cup having a sharp egg-engaging edge, a standard having an aperture, an axially extending projection on the base of said cup and extending through said aperture, a spring washer on said projection arranged to urge said cup and said standard into normal abutting engagement, a head on said projection retaining said cup, standard, and washer in engaging relation, and a hammer head mounted for relative movement with respect to said standard and arranged to provide an axial impact to said projection.

6. A device for cutting an egg shell by impact comprising a cup having sharp egg-engaging edges, a standard for carrying said cup and having an aperture covered by the base of said cup, an axial projection on the base of said cup and rigidly affixed thereto whereby axially applied impact may be imparted to said cup, a head on said projection, a hammer movably mounted on said standard for engaging said head, a concave spring washer, said projection passing through said aperture and threading said spring washer, said washer arranged to maintain said cup and said standard in normal engagement but to allow relative movement therebetween upon impact by said hammer.

RICHARD A. HAEGELE.

REFERENCES CITED

The following references are of record in the file of this patent:

UNITED STATES PATENTS

| Number | Name | Date |
| --- | --- | --- |
| 1,030,324 | Pender | June 25, 1912 |
| 1,284,132 | Nikolow | Nov. 5, 1918 |
| 2,260,836 | Haegele | Oct. 28, 1941 |